April 2, 1929.  A. B. HULSEBOS  1,707,723
AUTOMOBILE IDENTIFICATION
Filed Oct. 4, 1928
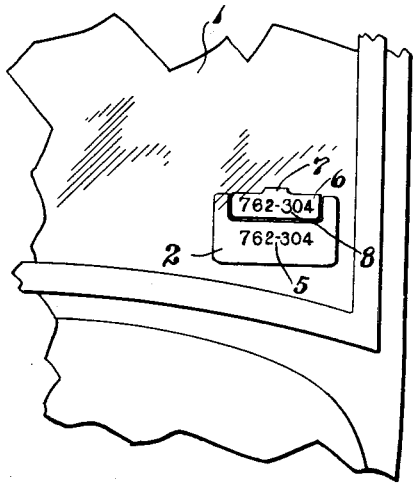
Fig. 1.
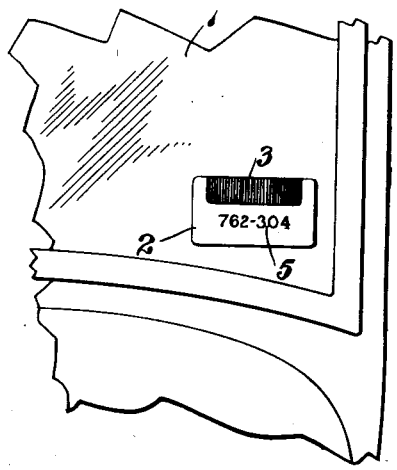
Fig. 2.
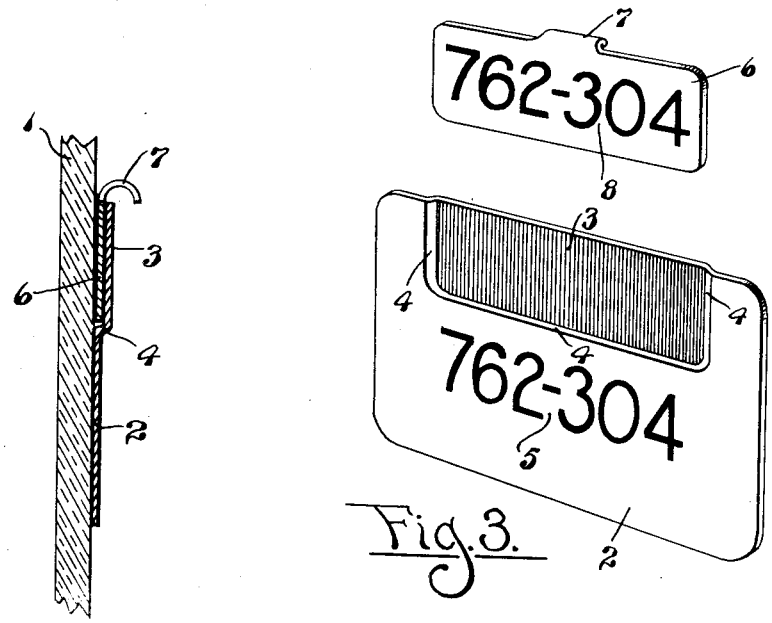
Fig. 3.
Fig. 4.
Inventor
Albert B. Hulsebos
By Linnance and
Van Antwerp
Attorneys Patented Apr. 2, 1929.

1,707,723

UNITED STATES PATENT OFFICE.

ALBERT B. HULSEBOS, OF HOLLAND, MICHIGAN.

AUTOMOBILE IDENTIFICATION.

Application filed October 4, 1928. Serial No. 310,244.

This invention relates to an automobile identification appliance adapted to be attached to the windshield or any other suitable place on the automobile for the purpose of identifying and safeguarding the motor vehicle against theft, unauthorized use and the like. It is an object and purpose of the present invention to provide a very simple yet effective identification and safeguarding device, one which can be manufactured at low cost, one which can be easily applied to motor vehicles and when applied is to all intents and purposes permanently secured thereto, yet which can be removed for replacement by another of the same kind when the license number of the machine is changed, the removal, however, not being easy and serving to practically destroy the effectiveness of the device for further use.

An understanding of the invention may be had from the following description taken in connection with the accompanying drawing, in which, Fig. 1 is a fragmentary front elevation of a motor vehicle illustrating the attachment of the device to the windshield of the vehicle, and with the device as it will be when the vehicle is in operation.

Fig. 2 is a similar view showing the key member of the device removed and as the vehicle will be left when it is parked or not in use.

Fig. 3 is a perspective view showing the two members which are used in making the device of my invention, and, Fig. 4 is a fragmentary vertical section through an automobile windshield with the identifying device in use thereon.

Like reference characters refer to like parts in the different figures of the drawings.

The windshield 1 of glass may be of any well known form. At a convenient place on the rear side of the windshield one of the members of said device is to be secured. It comprises a flat plate 2 of sheet metal, preferably, which at its upper portion has a section 3 pressed rearwardly and which is connected at its edges to the plate 2 by the sides and bottom 4. When this plate is attached to the rear side of the windshield glass a pocket is formed between the glass, said section 3 and the sides and bottom 4 described, which is open at its upper side as is evident. On the front side of the plate 2 where it will show through the windshield glass the license number of the automobile appears, painted or otherwise attached, as indicated at 5.

The other member of the device, which may be termed a key, is a flat plate 6 of sheet metal having a length slightly less than the section 3 and a height equal substantially to the height of said section 3, so that it may be readily inserted in the pocket described. At its upper edge it is formed with an integral rearwardly extending hook 7 which may be grasped for inserting or removing the key. The key at its front side carries the same license number indicated at 8, as appears on the front side of the plate 2. It is intended that these figures, which are to be the same as the license numbers of the motor vehicle, on the plate 2 and on the key 6 shall be identical in appearance, having the same style, size and color and in other ways exactly corresponding.

In the use of the device, with the plate 2 properly cemented to the rear side of the windshield glass, when the vehicle is in use the key member 6 is to be placed in the pocket. The front side of the section 3 of the pocket is preferably of a distinguishing contrasting color so that if the key is not in place its absence is very noticeable.

When the owner of the vehicle leaves the same the key is to be removed. Any one unauthorized who is driving the vehicle will have to drive the same without the key and it will be notice to officers of the law and others that the one driving the vehicle is likely one who has no right to it. At least it will attract attention and cause the vehicle driver to account for the absence of the key; and if he is the owner of the vehicle and has the key with him he can easily satisfy anyone inquiring. But an unauthorized person not having the proper key to correspond with the license number on the plate 2 will be easily detected.

The plate 2 cemented to the back of the windshield can be removed by cutting the cement but it is designed that such removal practically destroys the number at 5 on the plate so that it will not thereafter be useful. It has been found that ordinary fish glue will answer this purpose. This is necessary in order that the plate 2 and the key used therewith shall not be used on a vehicle on which it does not rightfully belong; but that the plate 2 may be removed and with its key thrown away at the end of any year when a new license and plates 2 and key to correspond therewith are issued.

The device described is a very simple and economical additional safeguard against theft of motor vehicles. It is to be issued by the State with the motor vehicle license. One or more of the same may be applied to a motor vehicle as on the windshield and on the rear window of the vehicle body though preferably it will be used only on the one place on the windshield in view of the convenience to the driver in removing and replacing the key.

The invention described is capable of embodiment in other forms as it is not necessary that the plate 2 be of sheet metal. The specific material used is not of consequence. The invention is defined in the appended claims and is to be considered comprehensive of all forms of structure coming within their scope.

I claim:

1. In combination with a transparent plate of a vehicle, a key member having a face with indicia exposed thereon, a holder coacting with said key member to retain said face substantially parallel with the transparent member, and means directly connecting the holder to the transparent plate, said holder having a face also presenting indicia in position to be read through the connecting means and the transparent plate, and said holder having a portion offset from said face to form with the opposed portion of the transparent plate a pocket extending from an edge of the holder inwardly of the same and removably enclosing said key member, the indicia on the key member being readable through the transparent plate.

2. In combination with a transparent plate of a vehicle, a key member having a face with indicia exposed thereon, a holder coacting with said key member to retain said face substantially parallel with the transparent member, and means directly connecting the holder to the transparent plate, said holder having a face also presenting indicia in position to be read through the transparent plate, said holder having a portion offset from said face to form with the opposed portion of the transparent plate a pocket extending from an edge of the holder inwardly of the same and removably enclosing said key member, the indicia on the key member being readable through the transparent plate.

3. In combination with a transparent plate of a vehicle, a key member having a face with indicia exposed thereon, a holder coacting with said key member to retain said face substantially parallel with the transparent member, and means directly connecting the holder to the transparent plate, said holder having a face also presenting indicia in position to be read through the transparent plate, said holder having a portion offset from said face to form with the opposed portion of the transparent plate a pocket extending from an edge of the holder inwardly of the same and removably enclosing said key member, the indicia on the key member being readable through the transparent plate, said offset portion having a conspicuously colored surface visible through said transparent plate when said key member is removed from said holder.

4. In combination with a transparent plate of a vehicle, a key member having a face with indicia exposed thereon, a holder for said key member, said holder having a face also presenting indicia in position to be read through the transparent plate, means for attaching the holder to the transparent plate which will deface the second mentioned indicia upon the removal of the holder from the plate, and means on said holder for removably holding said key member on the holder with said face thereof arranged substantially parallel with the transparent member, the indicia on said key member being readable through the transparent plate when the key member is in position on the holder.

5. An identification device for an automobile comprising a holder having a substantially flat face adapted to be applied to a flat transparent plate on the automobile, said face having indicia thereon which are visible through such plate when the holder is applied thereto, said holder also having a portion offset from said face to provide a pocket between such offset portion and the transparent plate when the holder is applied thereto and a key member formed to substantially fit in said offset portion of the holder and adapted to occupy said pocket, said key member also having a substantially flat face with indicia thereon which are visible through said plate when the key member is operatively disposed in said pocket.

In testimony whereof I affix my signature.

ALBERT B. HULSEBOS.